United States Patent [19]

Oki et al.

[11] Patent Number: 5,802,528
[45] Date of Patent: Sep. 1, 1998

[54] METHOD AND APPARATUS FOR DATA COMPARISONS

[75] Inventors: Brian M. Oki; James Stamos, both of San Jose; Gary Hallmark, San Carlos, all of Calif.

[73] Assignee: Oracle Corporation, Redwood Shores, Calif.

[21] Appl. No.: 655,321

[22] Filed: May 24, 1996

[51] Int. Cl.$^6$ .................................. G06F 17/30
[52] U.S. Cl. ...................... 707/201; 707/2; 707/3
[58] Field of Search .................... 345/602, 617, 345/603; 707/2, 3, 201

[56] References Cited

U.S. PATENT DOCUMENTS

5,129,082  7/1992  Tirfing et al. .................... 395/603
5,479,654  12/1995  Squibb .................... 395/617

*Primary Examiner*—Paul R. Lintz
*Attorney, Agent, or Firm*—McDermott, Will & Emery

[57] ABSTRACT

A method and apparatus for comparing a first set of data and a second set of data are disclosed. A subset of base data is compared to a subset of replicated data to determine discrepancies. These discrepancies are then used to modify the replicated set of data, and the replicated set of data thus becomes identical to the base set of data. Alternately, the base data is compared directly to the replicated data and differences between the base data and the replicated data are obtained. These differences are then used to modify the replicated data to become identical to the base data.

5 Claims, 10 Drawing Sheets

METHOD AND APPARATUS FOR DATA COMPARISONS

FIELD OF THE INVENTION

This invention relates to the field of database systems. Specifically, the present invention relates to a method and system for performing comparisons between sets of replicated data.

BACKGROUND OF THE INVENTION

Database systems often locally replicate remote tables that are frequently queried by local users. By having local copies of heavily accessed data on several nodes, the database does not need to send information across the network every time a transaction on any of the several nodes requires access to the data. Thus, the use of local copies of data increases the performance of the requesting node and reduces the amount of inter-node traffic.

The copies of data stored at replicated sites may diverge from the data at the original or "base" site for any number of reasons. For example, software problems or conflict resolution issues may cause a database to replicate data incorrectly. To determine whether discrepancies exist between different copies of the same data, it would be beneficial to have a mechanism for comparing the replicated data to the corresponding data in the base site. Once the discrepancies are identified, they can be rectified.

SUMMARY OF THE INVENTION

A method and apparatus for performing data comparisons between replicated data systems is provided. According to one embodiment of the present invention, a set of data generated from data located at a base site is compared to a set of data generated from data located at a replicated site. These sets of data are created by applying a statistical sampling function to the data located at the two sites, and will typically be significantly smaller than the original data. The output of the comparison is indicative of differences between the base data and the replicated data. The information contained in the output of differences may be used to modify the replicated data such that the replicated data becomes identical to the base data.

In another embodiment of the present invention, a comparison unit compares the base data to the replicated data and outputs a first and a second result. The first result is indicative of data in the replicated data that is not also in the base data, while the second result is indicative of data in the base data that is not also in the replicated data. The first and second results are combined to create a third result and the third result can then be used to modify the replicated data. After modification, the replicated data is identical to the base data.

According to an aspect of the invention, the base data or the replicated data may be modified by users during comparison. Thus, the result of the comparison is true at a particular point in time. When users are allowed to modify the base or replicated data during comparison, however, there is no guarantee that the comparison may be used to reconcile differences.

BRIEF DESCRIPTION OF THE DRAWINGS

The present invention is illustrated by way of example, and not by way of limitation, in the figures of the accompanying drawings in which like reference numerals refer to similar elements and in which.

DETAILED DESCRIPTION OF THE PREFERRED EMBODIMENT

The present invention relates to a method and apparatus for comparing a first set of data and a second set of data. In the following detailed description, numerous specific details are set forth in order to provide a thorough understanding of the present invention. It will be apparent to one of ordinary skill in the art, however, that these specific details need not be used to practice the present invention. In other instances, well-known structures, interfaces, and processes have not been shown in detail in order not to unnecessarily obscure the present invention.

Figure 1A:
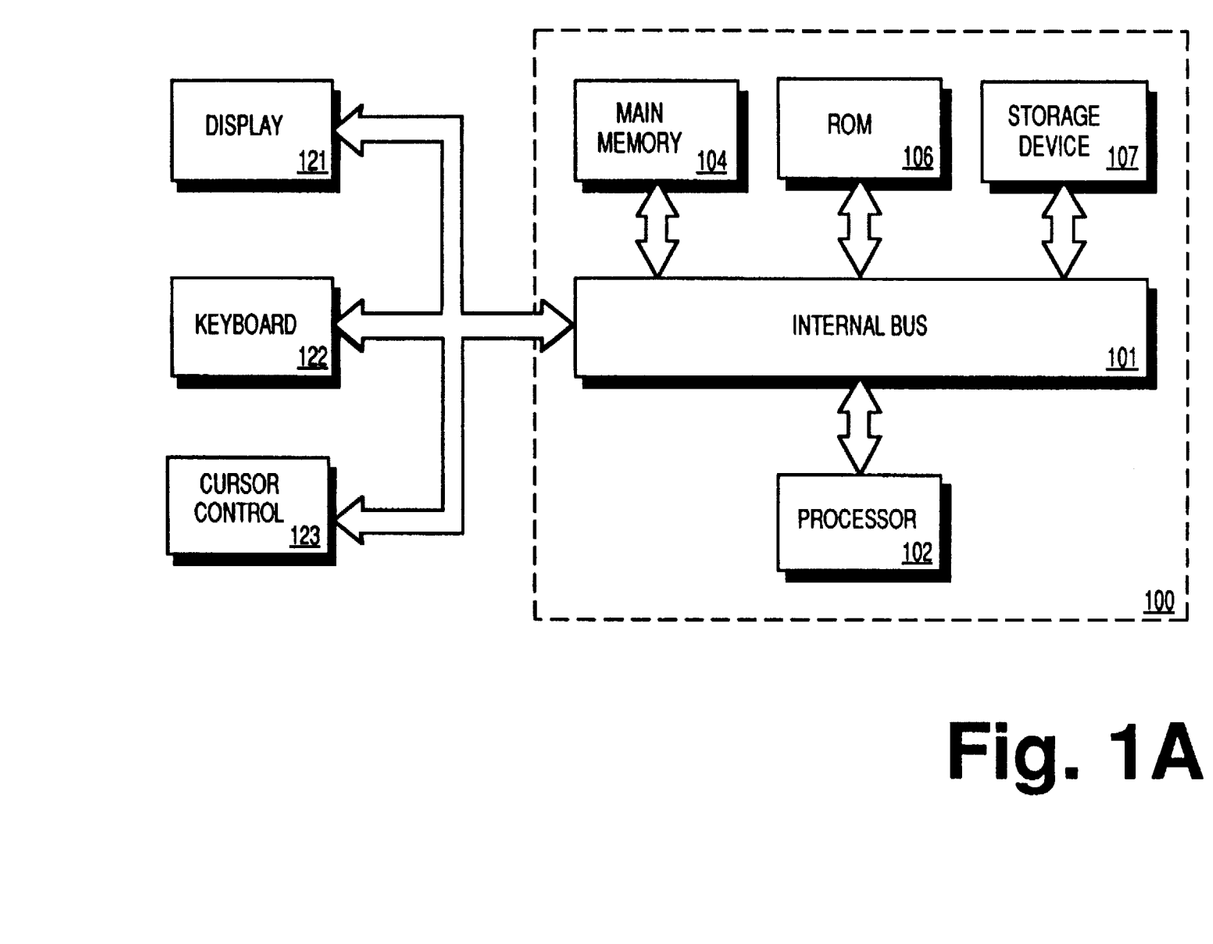
FIG. 1A illustrates the computer system upon which one embodiment of the present invention can be implemented.

Referring to FIG. 1, the computer system upon which an embodiment of the present invention can be implemented is shown as 100. Computer system 100 comprises an internal bus or other communication means 101 for communicating information, and a processing means 102 coupled with internal bus 101 for processing information. System 100 further comprises a random access memory (RAM) or other dynamic storage device 104 (referred to as main memory), coupled to internal bus 101 for storing information and instructions to be executed by processor 102. Main memory 104 also may be used for storing temporary variables or other intermediate information during execution of instructions by processor 102. Computer system 100 also comprises a read only memory (ROM) and/or other static storage device 106 coupled to internal bus 101 for storing static information and instructions for processor 102. Data storage device 107 is coupled to internal bus 101 for storing information and instructions.

A data storage device 107 such as a magnetic disk or optical disc and its corresponding drive can be coupled to computer system 100. Computer system 100 can also be coupled via internal bus 101 to a display device 121, such as a cathode ray tube (CRT), for displaying information to a computer user. An alphanumeric input device 122, including alphanumeric and other keys, is typically coupled to internal bus 101 for communicating information and command selections to processor 102. Another type of user input device is cursor control 123, such as a mouse, a trackball, or cursor direction keys for communicating direction information and command selections to processor 102 and for controlling cursor movement on display 121. This input device typically has two degrees of freedom in two axes, a first axis (e.g., x) and a second axis (e.g., y), which allows the device to specify positions in a plane.

Alternatively, other input devices such as a stylus or pen can be used to interact with the display. A displayed object on a computer screen can be selected by using a stylus or pen to touch the displayed object. The computer detects the selection by implementing a touch sensitive screen. Similarly, a light pen and a light sensitive screen can be used for selecting a displayed object. Such devices may thus detect selection position and the selection as a single operation instead of the "point and click," as in a system incorporating a mouse or trackball. Stylus and pen based input devices as well as touch and light sensitive screens are well known in the art. Such a system may also lack a keyboard such as 122 wherein all interface is provided via the stylus as a writing instrument (like a pen) and the written text is interpreted using optical character recognition (OCR) techniques.

The present invention is related to the use of computer system 100 to perform comparisons to determine whether sets of data located at different sites within a computer system are identical. According to one embodiment, such comparisons are performed by computer system 100 in response to processor 102 executing sequences of instructions contained in memory 104. Execution of the sequences of instructions contained in memory 104 causes processor 102 to generate comparison data based on a first set of data and compare the comparison data to comparison data generated based on a second set of data, as will be described hereafter. In alternative embodiments of the present invention, hard-wired circuitry may be used in place of or in combination with software instructions to implement the present invention. Thus, the present invention is not limited to any specific combination of hardware circuitry and software.

Figure 1B:
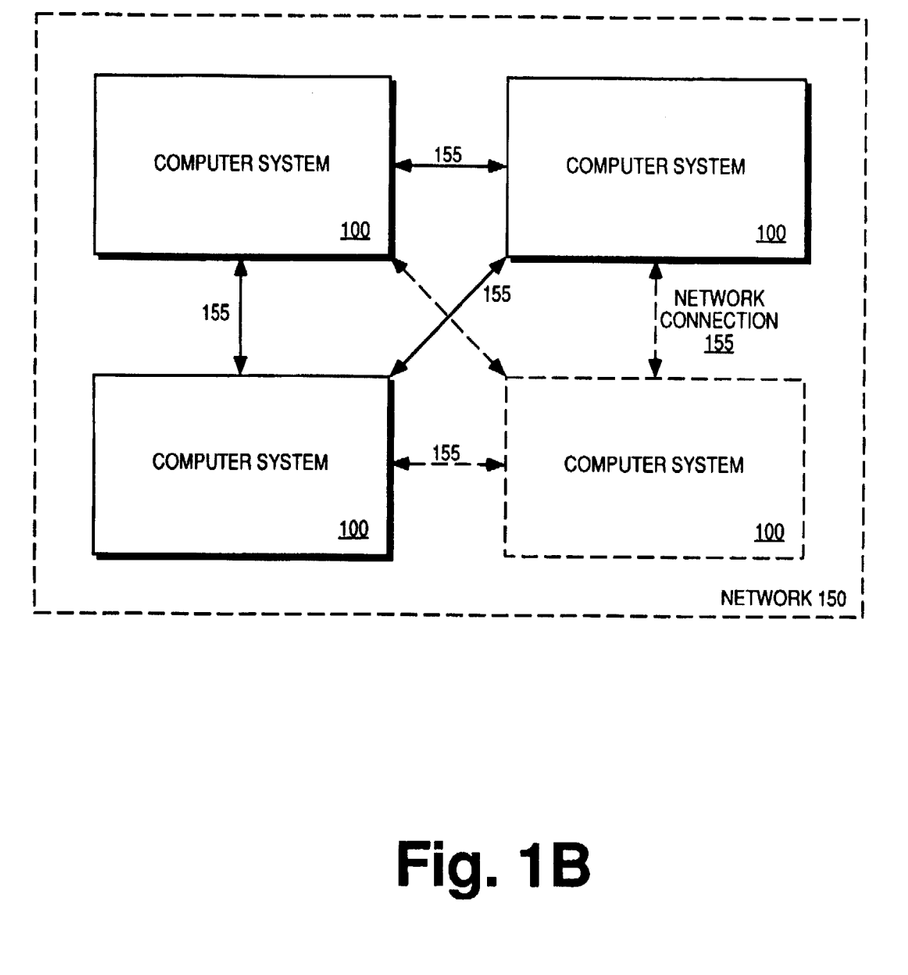
FIG. 1B illustrates the network system within which one embodiment of the present invention can be implemented.

FIG. 1B illustrates the network system within which an embodiment of the present invention can be implemented. Network system 150 depicts multiple computer systems 100 connected via network connections 155. Network system 150 may be any type of network including Local Area Networks (LANs), ISDN networks and Wide Area Networks (WANs) that use a variety of network connections including Ethernet, cable network connections and satellite connections. Computer systems 100 can send and receive data and instructions over network connections 155. This network communication may utilize any type of networking protocol appropriate for the network connection 155 being used. For example, protocols such as TCP/IP and/or X.25 can be used over an appropriate network connection. The claimed invention can be implemented using any combination of compatible network protocols and network connections.

A. Comparing data at multiple sites

Figure 2:
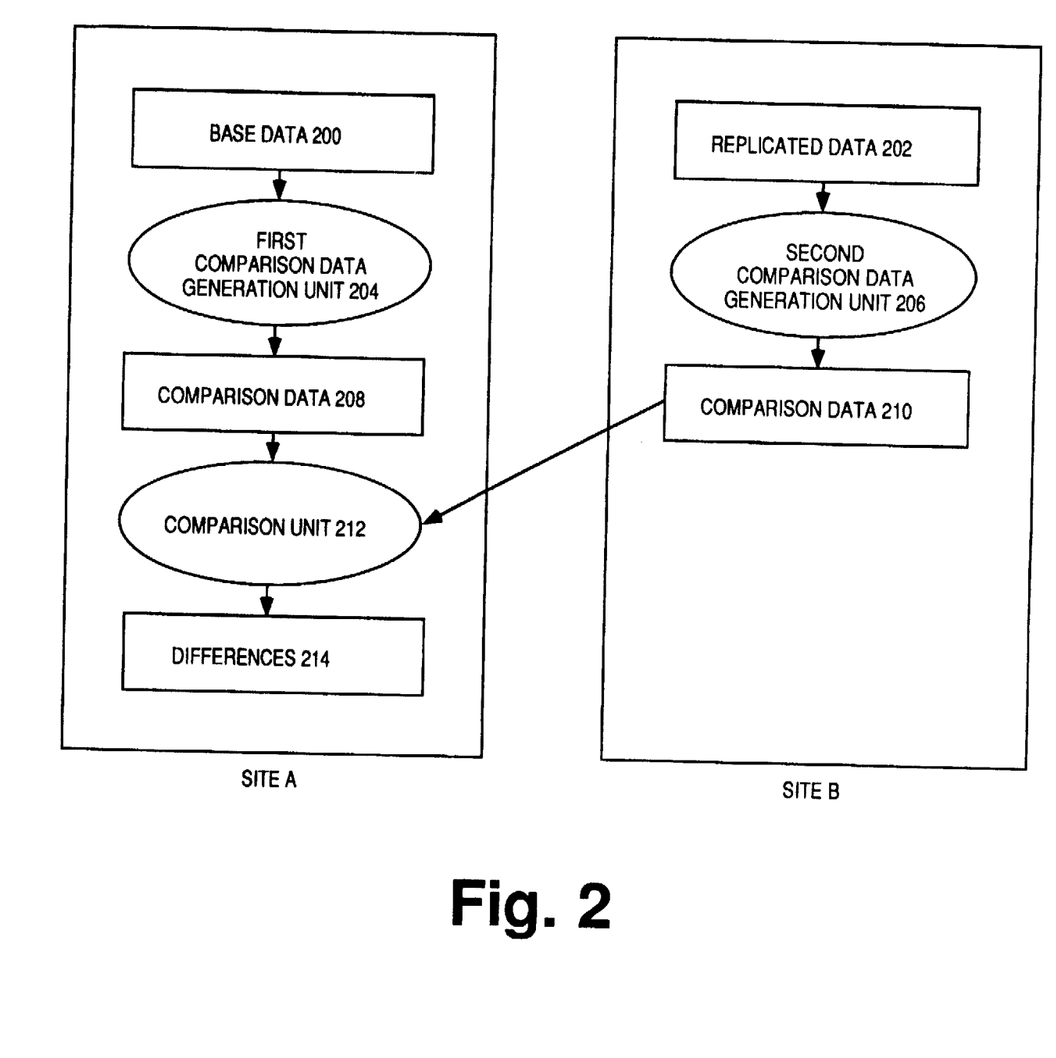
FIG. 2 is a block diagram of a system in which data at multiple sites may be compared according to an embodiment of the present invention.

FIG. 2 is a block diagram of a system in which data at multiple sites may be compared according to an embodiment of the present invention. Site A represents the base site or the "truth" site, containing Base Data 200. This base site will be used as a reference site for the comparisons. Site B represents a replicated site containing Replicated Data 202. The present invention can be used to determine discrepancies between Base Data 200 at Site A and Replicated Data 202 at Site B. Comparison Data 208 is a set of data created from Base Data 200 by a First Comparison Data Generation Unit 204 at site A, while Comparison Data 210 is a set of data created from Replicated Data 202 by a Second Comparison Data Generation Unit 206 at replicated Site B. According to one embodiment, Comparison Data 208 and 210 can also be created at a third site instead of at Sites A and B. Comparison Data 208 and 210 are created by a statistical sampling function and are significantly smaller than the respective originals, Base Data 200 and Replicated Data 202.

Comparison Data 210 is transmitted from Site B to Site A. Comparison Unit 212 then performs a comparison between Comparison Data 208 and Comparison Data 210 at Site A, and generates data indicating whether Comparison Data 208 matched Comparison Data 210. In the example illustrated in FIG. 2, Comparison Unit 212 then outputs the results of the comparison as Differences 214. Because Comparison Data 210 is smaller than both Base Data 200 and Replicated Data 202, the intersite traffic required to perform the comparison is significantly less than the traffic that would be generated if Replicated Data 202 itself was transmitted to Site A.

Base Data 200 and Replicated Data 202 may each contain duplicate data items. Data items are duplicates if they each have the same value. One embodiment of the present invention handles duplicates by treating them as different, distinct data items.

For the purposes of explanation, an embodiment of the invention has been described that performs comparisons at the site that contains the base data. The location at which the comparison is performed may, however, vary from implementation to implementation. For example, an alternate embodiment may perform the comparisons at the site that contains the replicated data, or at a third site. Further, another embodiment may vary the location at which the comparison is performed based on conditions that exist within the computer system. The present invention is not limited to performing the comparison at any particular site.

According to one embodiment, Differences 214 is stored in a form that is accessible to a user. For example, Differences 214 may be a table in which each row identifies a difference between Comparison Data 208 and Comparison Data 210. To reconcile any differences between Base Data 200 and Replicated Data 202, portions of Base Data 200 may be selected based on the information contained in Differences 214. These portions may be transmitted to Site B and stored over the corresponding portions of Replicated Data 202. This modification or reconciliation results in Replicated Data 202 at Site B becoming identical to Base Data 200 at Site A. Details of this reconciliation are described further under the heading "Reconciling data at multiple sites."

Figure 3:
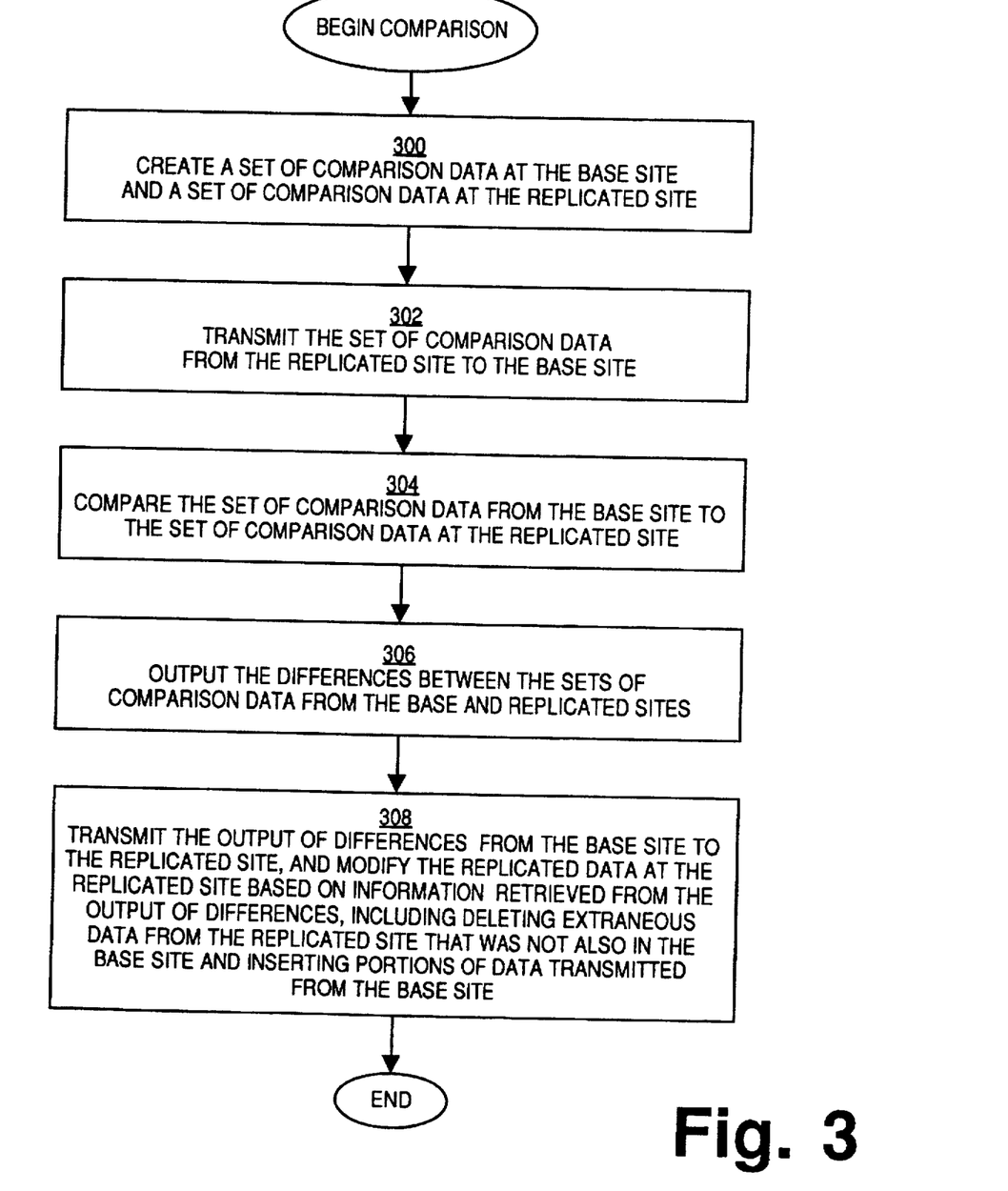
FIG. 3 is a flowchart illustrating steps for determining whether data located at two sites are identical according to one embodiment of the invention.

FIG. 3 is a flowchart illustrating steps for determining whether data located at two sites are identical according to one embodiment of the invention. In step 300, comparison data generation units create a set of comparison data at the base site and a set of comparison data at the replicated site. The set of comparison data at the replicated site is then transmitted from the replicated site to the base site in step 302. In step 304, a comparison unit compares the set of comparison data from the base site to the set of comparison data from the replicated site. The differences between the sets of comparison data are then output in step 306. Finally, in step 308, portions of the base data are transmitted from the base site to the replicated site based on the differences detected by the comparison unit. These portions of the base data represent information that is missing or different from the replicated data. According to one embodiment of the present invention, these portions of data are stored in dynamic memory at the replicated site, and are used to perform modifications to the replicated data that is stored on a static storage device at the replicated site. The modifications include the steps of deleting extraneous data at the replicated site and inserting the missing or different portions of data transmitted from the base data site.

Figure 4A:
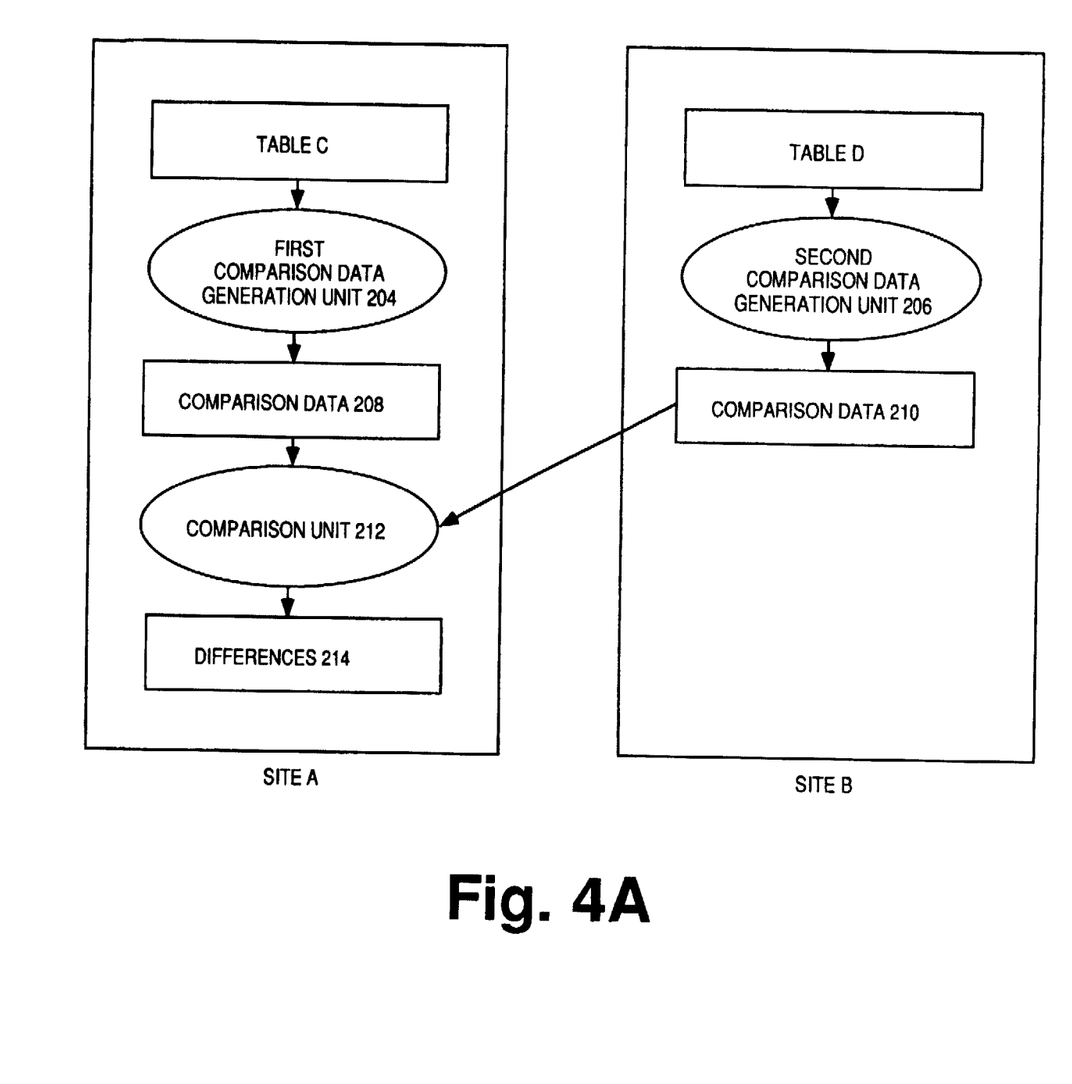
FIG. 4A illustrates an example of comparing two tables at different sites according to one embodiment of the present invention.
Figure 4B:
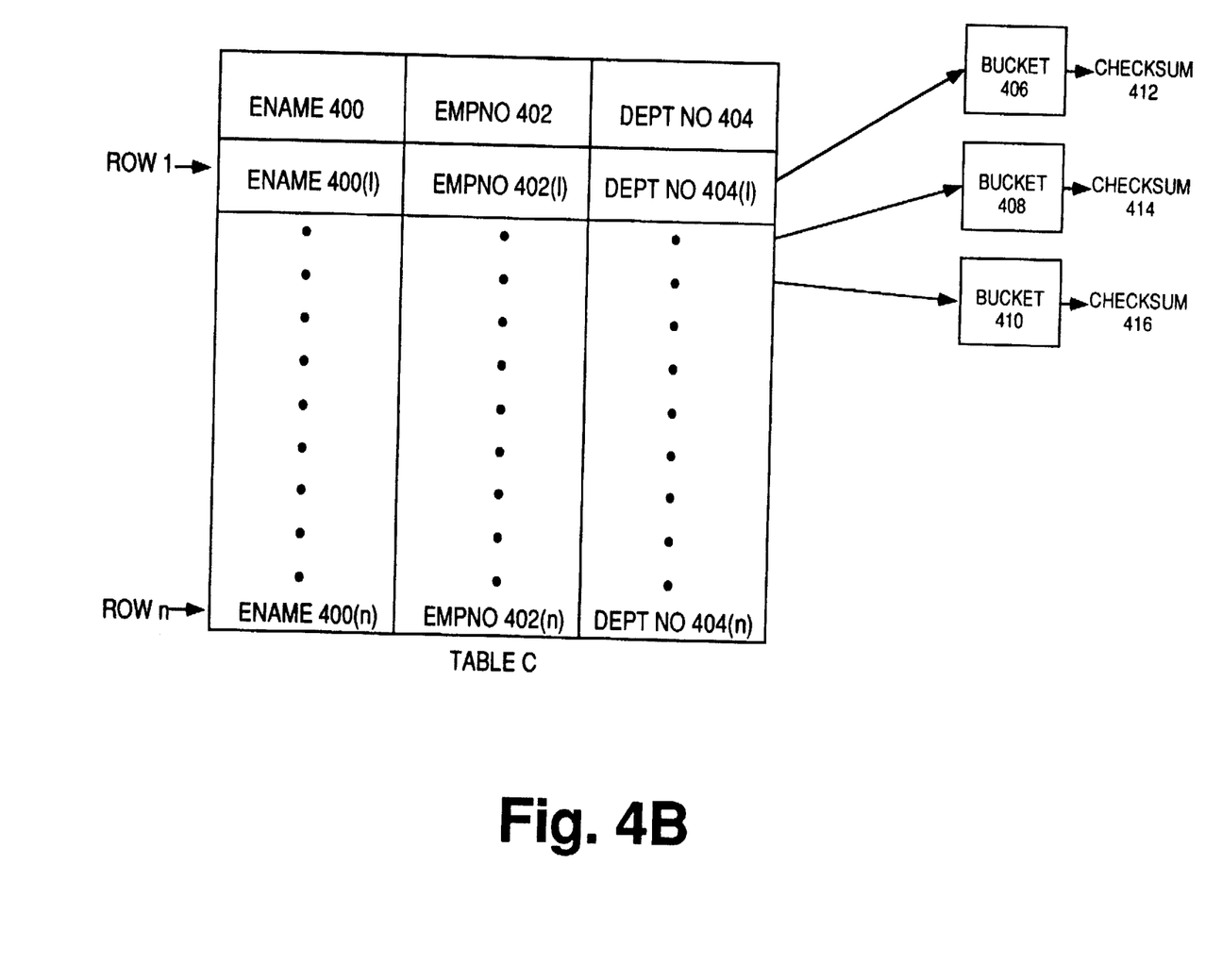
FIGS. 4B–C illustrate the processing method used to create comparison data according to one embodiment of the present invention.
Figure 4C:
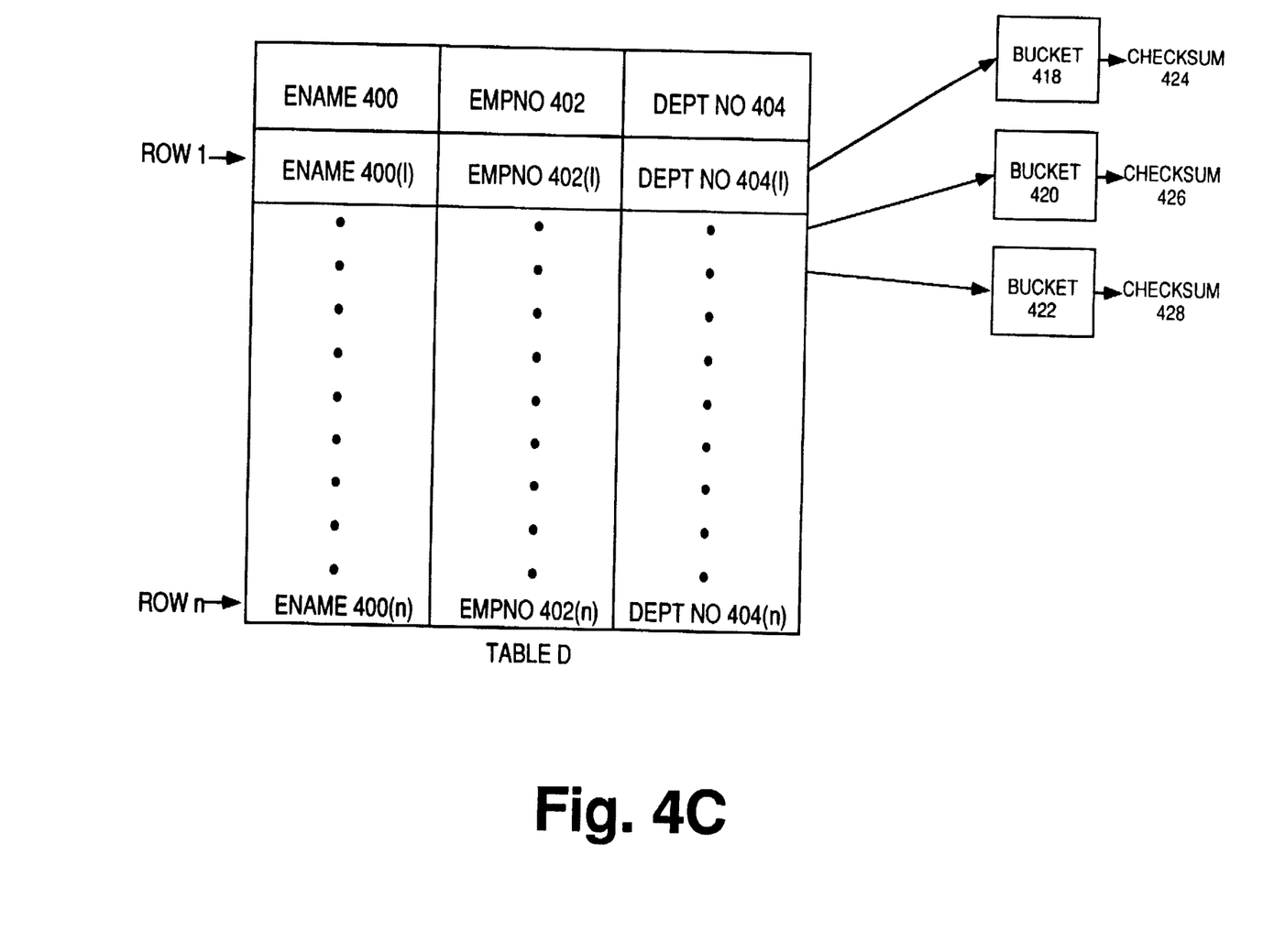

To further illustrate this embodiment of the present invention, FIGS. 4A–C show an example of comparing two tables at different sites. In this example, referring to FIG. 4A, Table C represents a base set of data and Table D represents a replicated set of data. In order to determine whether the data in Table C is identical to the data in Table D, First Comparison Data Generation Unit 204 processes Table C and outputs Comparison Data 208. Second Comparison Data Generation Unit 206 processes Table D and outputs Comparison Data 210.

FIGS. 4B and 4C illustrate the processing method used to generate comparison data according to one embodiment of the present invention. Ename 400, Empno 402 and Deptno 404 are columns in Tables C and D. Referring to FIG. 4B, First Comparison Data Generation Unit 204 at Site A uses a hash function to map n rows of Table C to a number of row group "buckets." For example, First Comparison Data Generation Unit 204 can use the hash function to map each row in Table C to one of three buckets: Bucket 406, Bucket 408 and Bucket 410. First Comparison Data Generation Unit 204 can use the hash function to map a predetermined number of rows, or all n rows in Table C into the three buckets.

Next, First Comparison Data Generation Unit 204 can use a checksum function to compute a cumulative checksum for each of the buckets, based on the data contained in the rows that were mapped to the buckets. Checksums 412, 414 and 416, representing Comparison Data 208 in FIG. 4A, are then output from First Comparison Data Generation Unit 204.

Although in the present example First Comparison Data Generation Unit 204 can use the hash function to map each row to one of three buckets, another embodiment of the invention can partition the rows into a different number of buckets. Yet another embodiment of the invention can partition Table C by subsets of rows, instead of complete rows. Regardless of how the base data is partitioned using the hash function, in this example, each partition is always stored in a bucket that is then processed by the checksum function to output Comparison Data 208.

Referring again to FIG. 4A, Second Comparison Data Generation Unit 206 at Site B performs the same process described above for Table D. The results of this processing are shown in FIG. 4C: Second Comparison Data Generation Unit 206 creates Buckets 418, 420 and 422, performs a checksum function on the rows in each bucket, and outputs Checksums 424, 426 and 428. These checksums represent Comparison Data 210 in FIG. 4A. Checksums 424, 426 and 428 at Site B correspond to Checksums 412, 414 and 416 respectively at Site A. Note that both Comparison Data Generation Units 204 and 206 perform identical operations on their respective sets of input data to ensure that their resulting checksums will be identical if their input data is identical. These checksums are then processed by Comparison Unit 212, and Comparison Unit 212 outputs Differences 214.

Differences 214 contains information about the checksums that do not match. For example, if corresponding Checksums 412 and 424 do not match, then Bucket 406 and Bucket 418 are determined to contain different information. According to one embodiment, the information corresponding to each non-matching bucket is included in some format in Differences 214. These formats are discussed further under the heading "Reconciling data at multiple sites."

If the checksums for two buckets are equal, there is a degree of probability of that the data in the buckets are identical. The matching checksums will not, however, guarantee that the data in the corresponding buckets are identical. The exact probability that non-identical sets of data could produce matching comparison data will depend on the particular statistical sampling functions used. For example, the use of a particular hash function with a particular checksum function may allow for one probability, while other combinations of statistical sampling functions will yield different probabilities.

The above example uses a hash function and a checksum function as the statistical sampling functions to partition the data and to create a value for comparison. Other statistical sampling functions may also be implemented. For example, in one embodiment, the number of bytes of data in Table C may be compared to the number of bytes of data in Table D. As described above, different statistical sampling functions will yield different probabilities of matching data.

In the above embodiment, the checksum data that is used for comparison is significantly smaller than the original base and replicated data. By only transmitting the checksum data from the replicated site to the base site, the network traffic generated between the base and replicated sites is minimized. Thus, the process of comparing the base and replicated sites may be performed at any time, even during peak network traffic hours, without adding significantly to the network congestion. The actual reconciliation process that requires more data to be transmitted can then be scheduled during slower network traffic hours.

Figure 5:
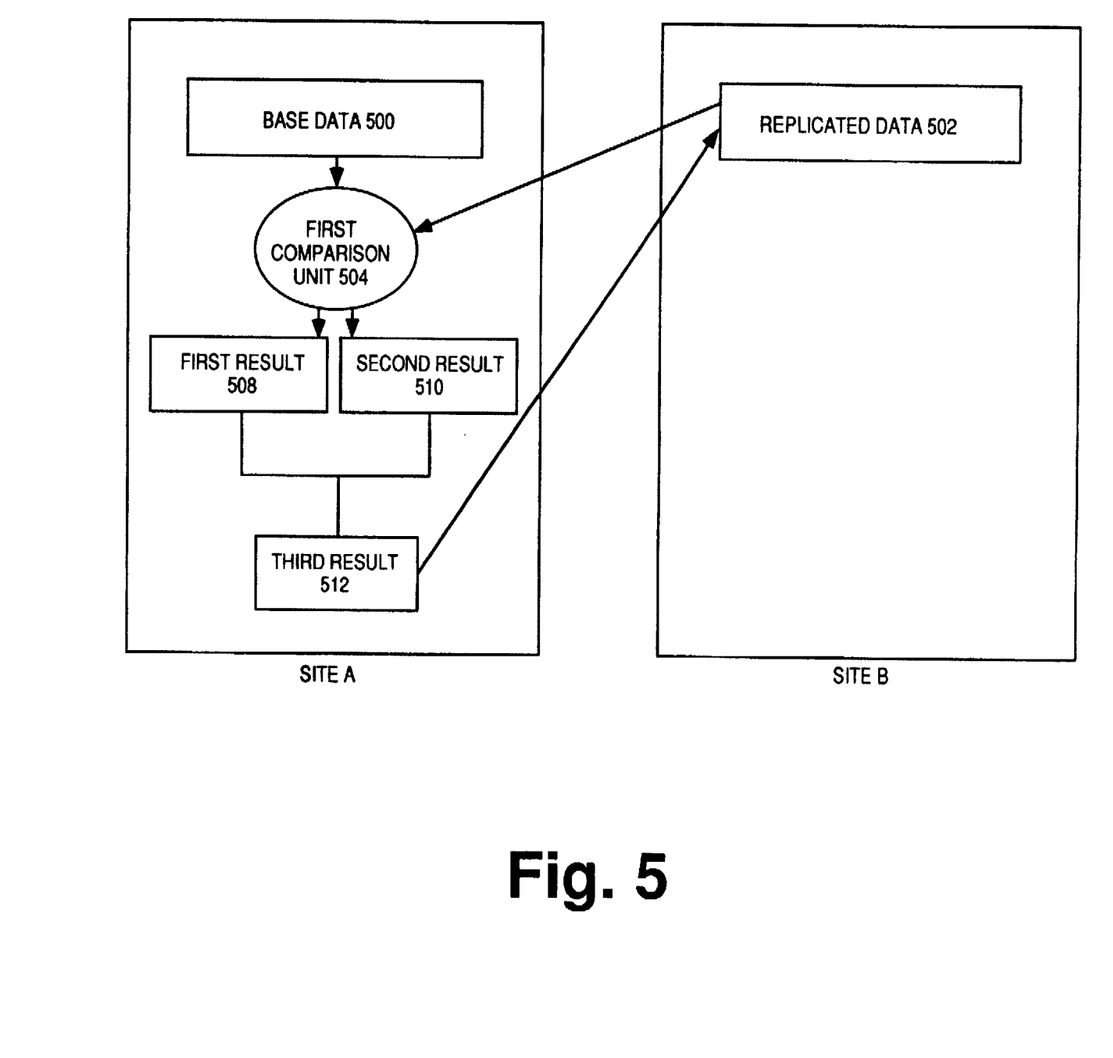
FIG. 5 is a block diagram of a system in which data at multiple sites may be compared according to another embodiment of the present invention.

FIG. 5 is a block diagram of a system in which data at multiple sites may be compared according to another embodiment of the present invention. A First Comparison Unit 504 compares Base Data 500 at Site A to Replicated Data 502 at Site B and generates a First Result 508 and a Second Result 510 at Site A. First Result 508 represents all data in Replicated Data 502 that is not also in Base Data 500 while Second Result 510 represents all data in Base Data 500 that is not also in Replicated Data 502.

Base Data 500 and Replicated Data 502 may each contain duplicate data items. This embodiment of the invention handles duplicate data items by treating the duplicate items as a single data item, rather than as different items. This embodiment may thus yield different results from the results generated by another embodiment that uses a different method of handling duplicate data items.

First Result 508 and Second Result 510 are combined to create a Third Result 512, where Third Result 512 is indicative of differences between Base Data 500 and Replicated Data 502. Third Result 512 is then transmitted from Site A to Site B, and Replicated Data 502 can be modified according to the contents of Third Output 512. According to one embodiment of the present invention, Third Result 512 is stored in dynamic memory at Site B, and is used to perform modifications to Replicated Data 502 that is stored on a static storage device at Site B. Base Data 500 at Site A will then be identical to Replicated Data 502 at Site B. Details of this modification are described further under the heading "Reconciling data at multiple sites."

Figure 6:
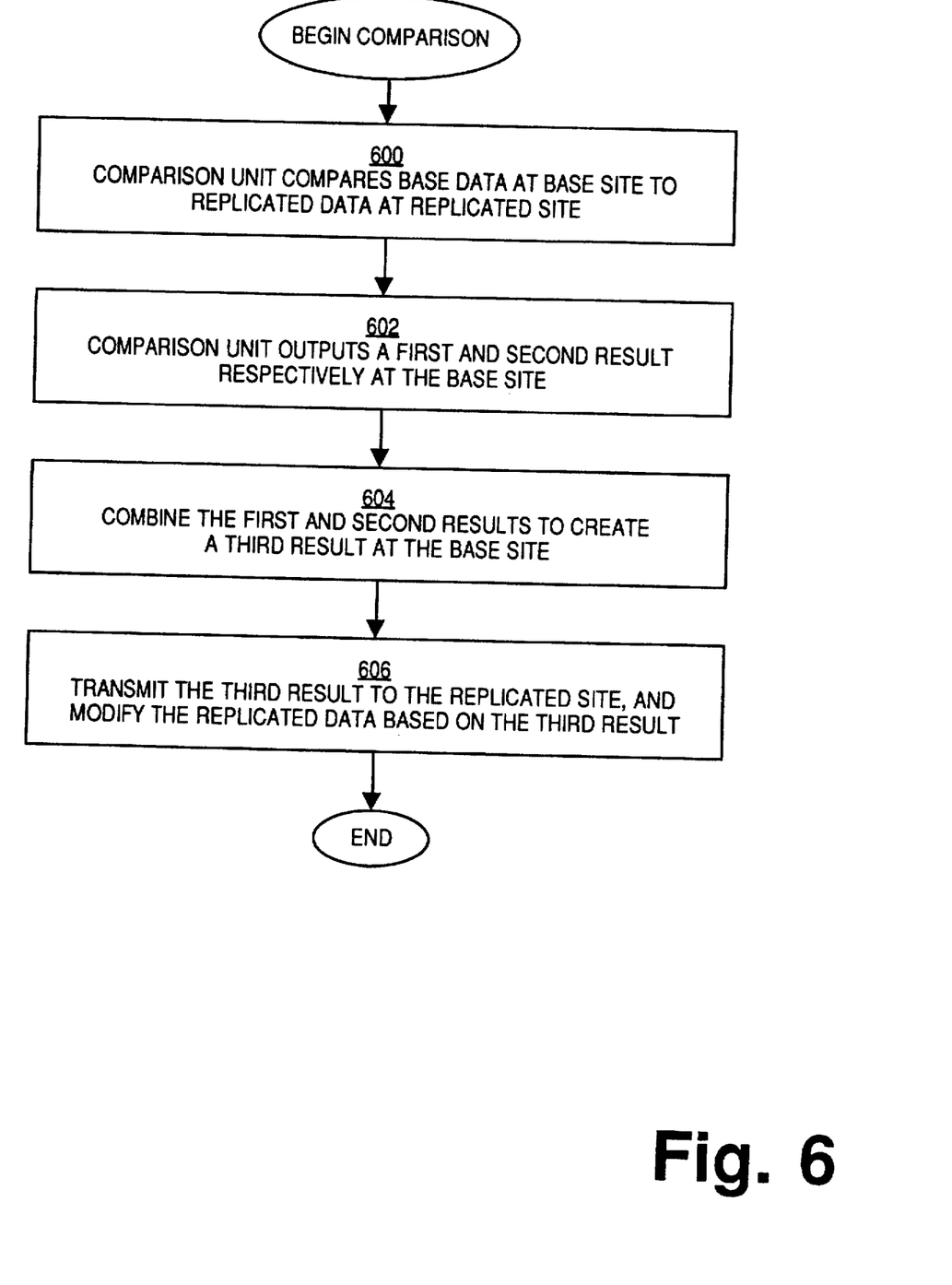
FIG. 6 is a flowchart illustrating steps for comparing two sets of data according to an embodiment of the present invention.

FIG. 6 is a flowchart illustrating steps for comparing two sets of data according to an embodiment of the present invention. In step 600, a comparison unit compares the base data at the base site to the replicated data at the replicated site. In step 602, a first result and a second result are output by the comparison unit at the base site. The first result represents all data in the replicated data that is not also in the base data, and the second result is all the data in the base data that is not also in the replicated data. In step 604, the first result and the second result are combined to create a third result at the base site, where the third result is indicative of differences between the base data and the replicated data. Finally, this third result is transmitted to the replicated site from the base site in step 606, and the replicated data at the replicated site can be modified based on the third result. According to one embodiment of the present invention, the third result is stored in dynamic memory at the replicated site, and is used to perform modifications to the replicated data that is stored on a static storage device at the replicated site.

Figure 7:
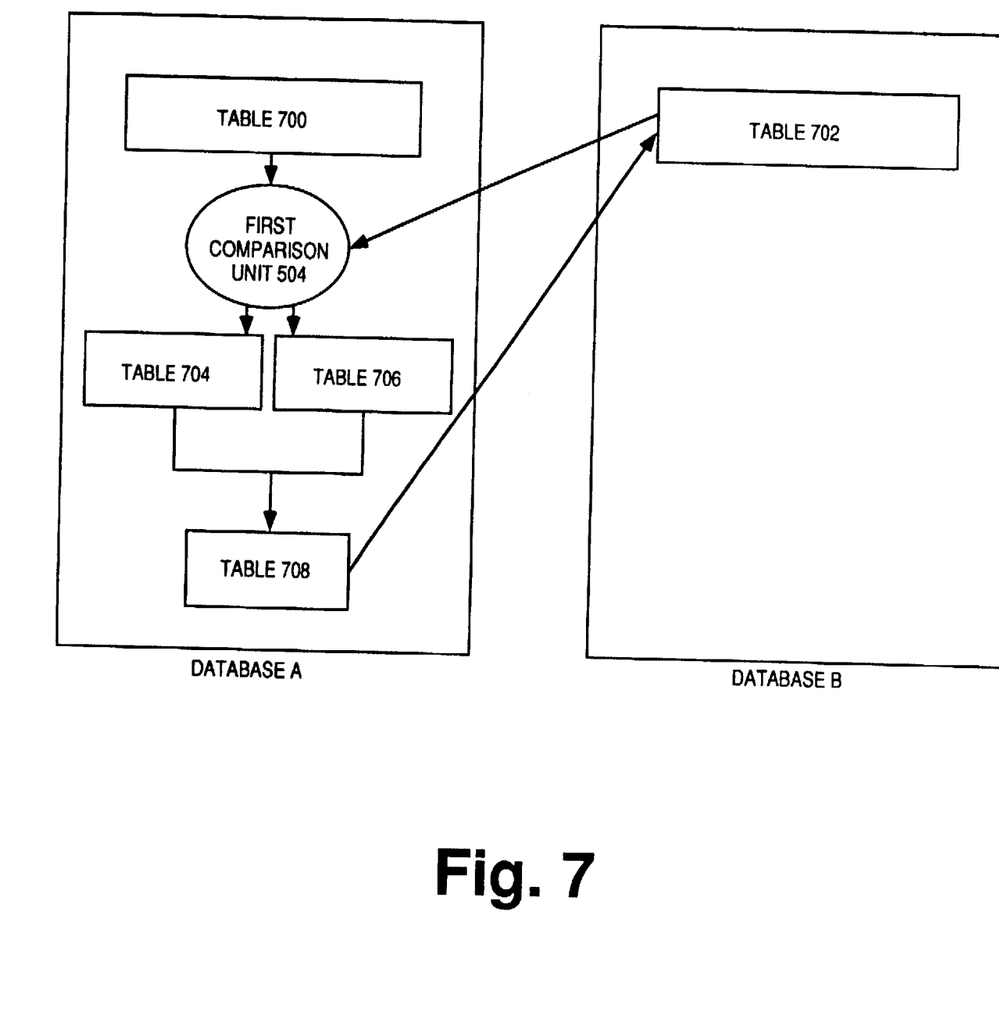
FIG. 7 is a block diagram illustrating an example of comparing tables within a relational database system.

To further illustrate this embodiment of the present invention, FIG. 7 is a block diagram showing an example of comparing tables within a relational database system. Referring to FIG. 7, Database A and Database B are relational databases containing Tables 700 and 702 respectively. Table 702 is a replicated copy of Table 700. In order to determine whether discrepancies exist between Table 700 and 702, a copy of Table 702 is sent to the site where Database A is stored. A First Comparison Unit 504 at that site compares Table 700 to Table 702 and outputs Tables 704 and 706. Table 704 contains all of the rows in Table 702 that are not also in Table 700. Table 706 contains all of the rows in Table 700 that are not also in Table 702. Tables 704 and 706 are then combined to create Table 708 where Table 708 contains all differences between Table 700 and Table 702. Table 708 is then used to modify Table 702. The modification includes the steps of deleting extraneous data in Table 702 and inserting the data from Table 708.

B. Reconciling data at multiple sites

As described above, discrepancies between two sets of data can be reconciled after the discrepancies have been identified. In order to allow a user more flexibility, the present invention allows for the reconciliation to be performed at any time after the comparisons are complete. In one embodiment, a user may decide to configure the reconciliation to occur automatically after the comparison. Alternatively, the user may choose to perform the reconciliation at a later time. In yet another embodiment of the present invention, the user may configure the reconciliation for only portions of the differences in the two sets of data.

Regardless of when it occurs, the reconciliation step utilizes the differences that were identified between the two sets of data in the comparison step. For example, referring to FIGS. 4A–C, once Differences 214 is generated, it can be transmitted from Site A to Site B and used to modify Table D. The contents of Differences 214 may be in a variety of formats. In one embodiment of the present invention, Differences 214 may be a table in which each row identifies a difference between Comparison Data 208 and Comparison Data 210, shown in FIG. 4A. The rows may contain simple pointers to the actual data in Table C. In this embodiment, data is retrieved from Table C only when a user decides to reconcile Tables C and D.

In another embodiment of the present invention, Differences 214 may be a table that contains the complete data for rows that are different in Tables C and D. In this embodiment, once non-matching checksum values are identified, the checksums are included in Differences 214. The checksums are then processed to retrieve data corresponding to the respective buckets of checksums that did not match. The retrieved data is then stored at Site A and can be transmitted from Site A to Site B at any time to reconcile Table D with Table C. In either of these embodiments, data will be retrieved from Table C.

Referring to FIG. 7, in yet another embodiment of the present invention, Table 708 contains all differences between Table 700 and Table 702. For example, if Table 708 contains a row that is not in Table 702, Table 708 will include the missing row retrieved from Table 700. Table 708 can then be used to reconcile Table 702 by inserting the missing row in Table 702.

Thus, a method and apparatus for comparing a first set of data and a second set of data are disclosed. The specific arrangements and methods described herein are merely illustrative of the principles of the present invention. Numerous modifications in form and detail may be made by those of ordinary skill in the art without departing from the scope of the present invention. Although this invention has been shown in relation to a particular preferred embodiment, it should not be considered so limited. Rather, the present invention is limited only by the scope of the appended claims.

What is claimed is:

1. A method for comparing a first set of data and a second set of data, the method comprising the steps of:

statistically sampling said first set of data to establish a first set of data groupings;

statistically sampling said second set of data to establish a second set of data groupings;

statistically sampling said first set of data groupings to generate a first set of comparison values;

statistically sampling said second set of data groupings to generate a second set of comparison values; and comparing said first set of comparison values to said second set of comparison values to determine whether said first set of data differs from said second set of data.

2. The method of claim 1, wherein:

wherein the first set of data groupings collectively contain less than all of said first set of data; and wherein the second set of data groupings collectively contain less than all of said second set of data.

3. The method of claim 1, wherein:

the first set of data resides at a first site;

the second set of data resides at a second site;

the method further includes the step of transmitting said first set of comparison values and said second set of comparison values to a third site; and the step of comparing is performed at said third site.

4. The method of claim 1, wherein:

said first set of data is located at a first site;

said second set of data is located at a second site;

said first site is remote with respect to said second site;

the step of statistically sampling said first set of data groupings to generate a first set of comparison values is performed at said first site;

the step of statistically sampling said second set of data groupings to generate a second set of comparison values is performed at said second site; and the step of comparing is begun at said first site after completely performing the steps of statistically sampling said first set of data groupings and statistically sampling said second set of data groupings.

5. The method of claim 1, wherein the step of statistically sampling said first set of data to establish a first set of data groupings includes applying a hash function to assign data from said first set of data to hash buckets.

* * * * *